(12) United States Patent
Hinson

(10) Patent No.: US 10,372,255 B2
(45) Date of Patent: *Aug. 6, 2019

(54) FORCE SENSOR ARRAY

(71) Applicant: Atmel Corporation, Chandler, AZ (US)

(72) Inventor: Nigel Hinson, Fareham (GB)

(73) Assignee: Nedron Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,310

(22) Filed: Mar. 12, 2018

(65) Prior Publication Data

US 2018/0196570 A1    Jul. 12, 2018

Related U.S. Application Data

(63) Continuation of application No. 15/177,864, filed on Jun. 9, 2016, now Pat. No. 9,927,901.

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04105* (2013.01); *G06F 2203/04106* (2013.01)

(58) Field of Classification Search
CPC .................. G06F 3/044; G06F 3/0414; G06F 2203/04105; G06F 3/0412; G06F 2203/04112
USPC .................................................. 345/173, 174
See application file for complete search history.

(56) References Cited

U.S. PATENT DOCUMENTS

| | | | |
|---|---|---|---|
| 7,663,607 | B2 | 2/2010 | Hotelling |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.

(Continued)

*Primary Examiner* — Koosha Sharifi-Tafreshi
(74) *Attorney, Agent, or Firm* — Shami Messinger PLLC

(57) ABSTRACT

An apparatus includes a force sensor circuit and a controller. The force sensor circuit includes first, second, third, and fourth electrodes disposed on a substrate. The first and second electrodes extend through first and second cells of a row of cells. The third and fourth electrodes extend through third and fourth cells of a column of cells. The first electrode occupies more area in the first cell than in the second cell. The second electrode occupies more area in the second cell than in the first cell. The third electrode occupies more area in the third cell than in the fourth cell. The fourth electrode occupies more area in the fourth cell than in the third cell. The controller detects a force and a position of the force based on signals communicated by the force sensor circuit.

20 Claims, 12 Drawing Sheets
(8 of 12 Drawing Sheet(s) Filed in Color)

(56) References Cited

U.S. PATENT DOCUMENTS

| | | | |
|---|---|---|---|
| 8,049,732 B2 | 11/2011 | Hotelling | |
| 8,179,381 B2 | 5/2012 | Frey | |
| 8,217,902 B2 | 7/2012 | Chang | |
| 8,723,824 B2 | 5/2014 | Myers | |
| 2005/0270039 A1* | 12/2005 | Mackey | G06F 3/044 324/660 |
| 2008/0309635 A1 | 12/2008 | Matsuo | |
| 2009/0315854 A1 | 12/2009 | Matsuo | |
| 2012/0098784 A1* | 4/2012 | Kim | G06F 3/044 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
N. Hinson U.S. Appl. No. 15/177,864, Notice of Allowance, dated Nov. 21, 2017.

* cited by examiner

FORCE SENSOR ARRAY

RELATED APPLICATION

This application is a continuation under 35 U.S.C. § 120 of U.S. application Ser. No. 15/177,864, filed Jun. 9, 2016 and entitled Force Sensor Array, incorporated herein by reference.

TECHNICAL FIELD

This disclosure generally relates to force sensing technology.

BACKGROUND

According to an example scenario, a force sensor detects the presence and position of a force applied within a force-sensitive area of a force sensor array integrated within a display stack. In a force-sensitive-display application, a force sensor array allows a user to interact directly with what is displayed on the screen, rather than indirectly with a mouse or touch pad. A force sensor is attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a force sensor.

In one example, when an object physically applies a force to a screen within a force sensitive area of a force sensor of the screen (e.g., by physically pressing a cover layer of the screen), a change in capacitance occurs within the screen at a position of the force sensor that corresponds to the position of the object within the force sensitive area of the force sensor. A force controller processes the change in capacitance to determine the position of the change of capacitance within the force sensor (e.g., within a force sensor array of the force sensor).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is made to the following descriptions, taken in conjunction with the accompanying drawings, in which.

DESCRIPTION OF EXAMPLE EMBODIMENTS

Certain devices include force sensors that can detect both the presence and a position of an applied force. The force can be applied to the device, for example, by pressing an object such as a finger and/or a stylus against the device. The force sensor can detect the position and/or location of the force and in some instances the magnitude of the force. The device then responds according to the location and the magnitude of the force. For example, a device may close an application if a large amount of force is applied to the device. As another example, the device may increase the contrast of a display if a small amount of force is applied to a particular portion of the device.

Existing force sensors detect a force by implementing an array of electrodes. When a force is applied to the device, the electrodes that are close to the applied force may experience a change in capacitance such as, for example, a change in mutual capacitance between the electrodes or a change in self capacitance. That change in capacitance may be detected by the device. The device may then process and respond to the detected force.

One challenge presented by existing force sensor arrays is the number of tracks used to couple the electrodes of the force sensor to a controller of the device. In existing force sensors each electrode of the force sensor couples to the controller through at least one track. Because existing force sensors use numerous electrodes to implement force sensing, the number of tracks is also numerous. The number of tracks results in less available space in the device to house other components. As a result, a force sensor may lead to fewer features being implemented in the device. Furthermore, the number of tracks results in a higher manufacturing cost because the device uses more pins and, in some instances, a dedicated force sensing system.

This disclosure contemplates a force sensor that can detect the presence, magnitude, and position of an applied force. The force sensor implements this force sensing using at most four electrodes. As a result, only four tracks are used to couple the force sensor to a controller. The reduced number of tracks increases the amount of available space to implement other features and/or hardware in the device. Additionally, by using four electrodes, it may be possible to implement the force sensor using the same controller and/or integrated circuit as a touch sensor in the same device. The force sensor and the device will be described in more detail using FIGS. 1 through 8B. The device will be described generally using FIGS. 1 through 3. FIG. 4 will describe existing force sensor implementations. The contemplated force sensor will be described in more detail using FIGS. 5A through 8B.

Figure 1:
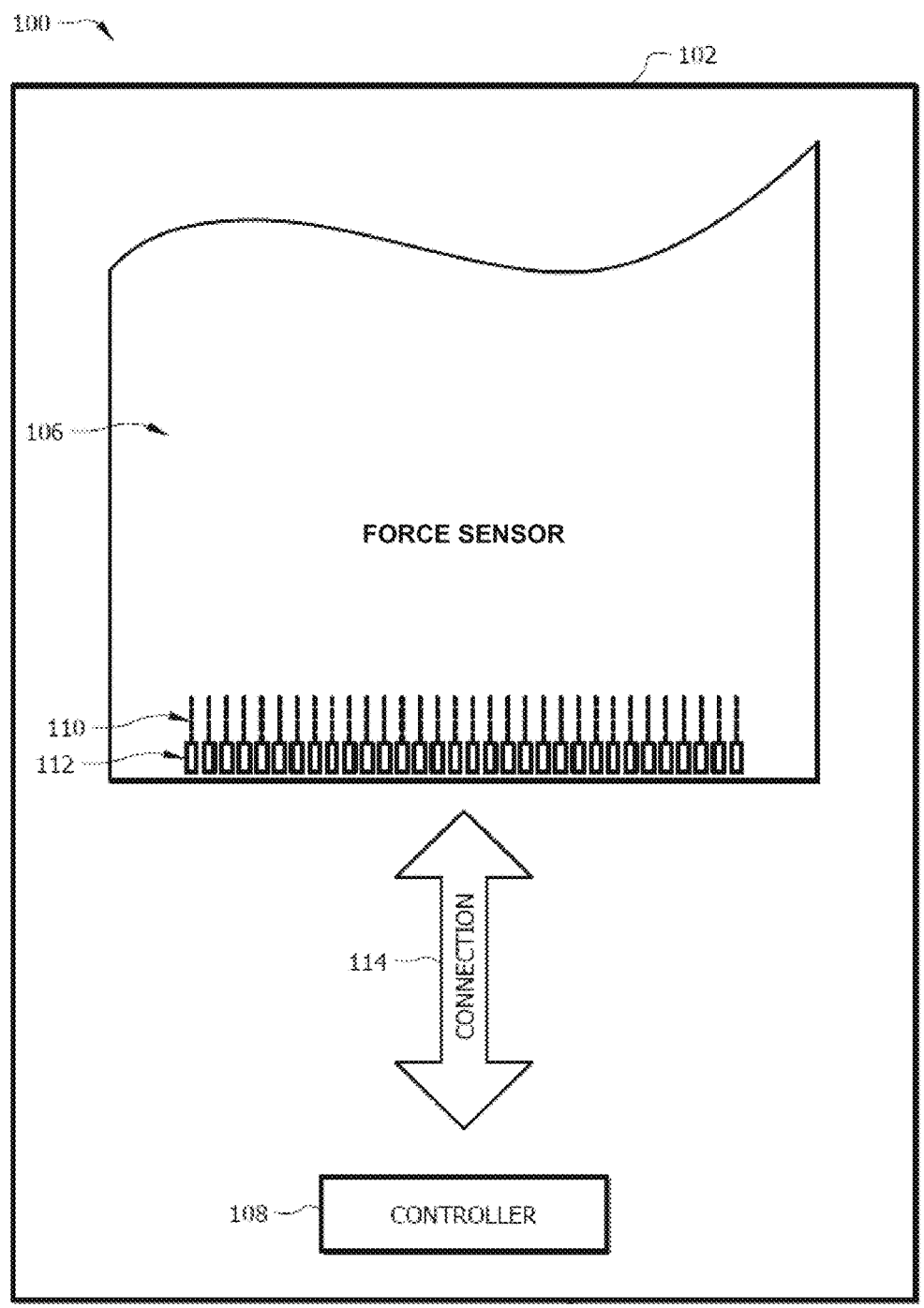
FIG. 1 illustrates an example system that includes a force sensor, according to an embodiment of the present disclosure.

FIG. 1 illustrates an example system 100 that includes a force sensor 102, according to an embodiment of the present disclosure. Force sensor 102 includes force sensor array 106 and force controller 108. Force sensor array 106 and force controller 108 detect the presence and position of a force within a force-sensitive area of force sensor array 106.

Force sensor array 106 includes one or more force-sensitive areas. In one embodiment, force sensor array 106 includes an array of electrodes disposed on one or more substrates, which are made of a dielectric material. Reference to a force sensor array can encompass both the electrodes of force sensor array 106 and the substrate(s) on which they are disposed. Alternatively, reference to a force sensor array may encompass the electrodes of force sensor array 106, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material (at least in part) create the shape of an electrode, and the area of the shape are (at least in part) bounded by those cuts. In one embodiment, the conductive material of an electrode occupies approximately 100% of the area of its shape. For example, an electrode is made of indium tin oxide (ITO) and the ITO of the electrode occupies approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. In one embodiment, an electrode is made of flexible printed circuit (FPC) type material (e.g., solid coppers areas on one or two layers/surfaces of a substrate). Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a force sensor array 106 constitute, in whole or in part, one or more macro-features of force sensor array 106. One or more characteristics of the implementation of those shapes (such as, for example, the conductive materials, fills, or patterns within the shapes) constitute in whole or in part one or more micro-features of force sensor array 106. One or more macro-features of a force sensor array 106 may determine one or more characteristics of its functionality, and one or more micro-features of force sensor array 106 may determine one or more optical features of force sensor array 106, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of force sensor array 106. For example, the mechanical stack may include a first layer of optically clear adhesive (OCA) beneath a cover panel. The cover panel may be clear and made of a resilient material, such as for example glass, polycarbonate, or poly(methyl methacrylate) (PMMA). This disclosure contemplates cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including force sensor array 106 and force controller 108. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of force sensor array 106 may be made of polyethylene terephthalate (PET) or another material. This disclosure contemplates any substrate with portions made of any material(s). In one embodiment, one or more electrodes in force sensor array 106 are made of ITO in whole or in part. Additionally or alternatively, one or more electrodes in force sensor array 106 are made of fine lines of metal or other conductive material. For example, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any electrodes made of any materials.

In one embodiment, force sensor array 106 implements a capacitive form of force sensing. In a mutual-capacitance implementation, force sensor array 106 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by force controller 108) induces a charge on the sense electrode, and the amount of charge induced is susceptible to external influence (such as a force or the proximity of an object). The drive and sense electrodes are separated by a flexible material that compresses when a force is applied to the material. When an object presses or applies a force within proximity of the capacitive node, the material compresses and the distance between the drive and sense electrodes proximate the capacitive node decreases resulting in a change in capacitance the capacitive node. Force controller 108 measures the change in capacitance. By measuring changes in capacitance throughout the array, force controller 108 determines the position of the force or proximity within force-sensitive areas of force sensor array 106.

In a self-capacitance implementation, force sensor array 106 may include an array of electrodes of a single type that may each form a capacitive node. When an object applies a force within proximity of the capacitive node, a change in self-capacitance may occur at the capacitive node and force controller 108 measures the change in capacitance, for example, as a change in the amount of charge implemented to raise the voltage at the capacitive node by a predetermined amount. As with a mutual-capacitance implementation, by measuring changes in capacitance throughout the array, force controller 108 determines the position of the force or proximity within force-sensitive areas of force sensor array 106. This disclosure contemplates any form of capacitive force sensing.

In one embodiment, force sensor array 106 includes electrodes disposed in a pattern on one side of a single substrate. In such a configuration, a pair of electrodes capacitively coupled to each other across a space between them form a capacitive node. As an example self-capacitance implementation, electrodes of a single type are disposed in a pattern on a single substrate. In addition or as an alternative to having electrodes disposed in a pattern on one side of a single substrate, force sensor array 106 may have electrodes disposed in a pattern on one side of a substrate and electrodes disposed in a pattern on another side of the substrate. In such configurations, an intersection of electrodes forms a capacitive node. Such an intersection may be a position where the electrodes "cross" or come nearest each other in their respective planes. The electrodes do not make electrical contact with each other—instead they are capacitively coupled to each other across a dielectric at the intersection. Although this disclosure describes particular configurations of particular electrodes forming particular nodes, this disclosure contemplates other configurations of electrodes forming nodes. Moreover, this disclosure contemplates other electrodes disposed on any number of substrates in any patterns.

As described above, a change in capacitance at a capacitive node of force sensor array 106 may indicate a force input at the position of the capacitive node. Force controller 108 detects and processes the change in capacitance to determine the presence and position of the force or proximity input. In one embodiment, force controller 108 then communicates information about the force or proximity input to one or more other components (such as one or more central processing units (CPUs)) of a device that includes force sensor array 106 and force controller 108, which may respond to the force or proximity input by initiating a function of the device (or an application running on the device). Although this disclosure describes a particular force controller 108 having particular functionality with respect to a particular device and a particular force sensor 102, this disclosure contemplates other force controllers having any functionality with respect to any device and any force sensor.

In one embodiment, force controller 108 is implemented as one or more integrated circuits (ICs), such as for example general-purpose microprocessors, microcontrollers, programmable logic devices or arrays, application-specific ICs (ASICs). Force controller 108 comprises any combination of analog circuitry, digital logic, and digital non-volatile memory. In one embodiment, force controller 108 is disposed on a flexible printed circuit (FPC) bonded to the substrate of force sensor array 106, as described below. The FPC may be active or passive. In one embodiment, multiple force controllers 108 are disposed on the FPC.

In an example implementation, force controller 108 includes a processor unit, a drive unit, a sense unit, and a storage unit. In such an implementation, the drive unit supplies drive signals to the drive electrodes of force sensor array 106, and the sense unit senses charge at the capacitive nodes of force sensor array 106 and provides measurement signals to the processor unit representing capacitances at the capacitive nodes. The processor unit controls the supply of drive signals to the drive electrodes by the drive unit and processes measurement signals from the sense unit to detect and process the presence and position of a force or proximity input within force-sensitive areas of force sensor array 106. The processor unit may also track changes in the position of a force or proximity input within force-sensitive areas of force sensor array 106. The storage unit stores programming for execution by the processor unit, including programming for controlling the drive unit to supply drive signals to the drive electrodes, programming for processing measurement signals from the sense unit, and other programming. Although this disclosure describes a particular force controller 108 having a particular implementation with particular components, this disclosure contemplates force controller having other implementations with other components.

Tracks 110 of conductive material disposed on the substrate of force sensor array 106 couple the electrodes of force sensor array 106 to connection pads 112, also disposed on the substrate of force sensor array 106. As described below, connection pads 112 facilitate coupling of tracks 110 to force controller 108. Tracks 110 may extend into or around (e.g., at the edges of) force-sensitive areas of force sensor array 106. In one embodiment, particular tracks 110 provide connections for coupling force controller 108 to electrodes of force sensor array 106. Tracks 110 are made of fine lines of metal or other conductive material. For example, the conductive material of tracks 110 may be copper or copper-based and have a width of approximately 100 µm or less. As another example, the conductive material of tracks 110 may be silver or silver-based and have a width of approximately 100 µm or less. In one embodiment, tracks 110 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 110, force sensor array 106 may include one or more ground lines terminating at a ground connector (which may be a connection pad 112) at an edge of the substrate of force sensor array 106 (similar to tracks 110).

Connection pads 112 may be located along one or more edges of the substrate, outside a force-sensitive area of force sensor array 106. As described above, force controller 108 may be on an FPC. Connection pads 112 may be made of the same material as tracks 110 and may be bonded to the FPC using an anisotropic conductive film (ACF). In one embodiment, connection 114 includes conductive lines on the FPC coupling force controller 108 to connection pads 112, in turn coupling force controller 108 to tracks 110 and to the drive or sense electrodes of force sensor array 106. In another embodiment, connection pads 112 are connected to an electro-mechanical connector (such as, for example, a zero insertion force wire-to-board connector). Connection 114 may or may not include an FPC. This disclosure contemplates any connection 114 between force controller 108 and force sensor array 106.

Figure 2:
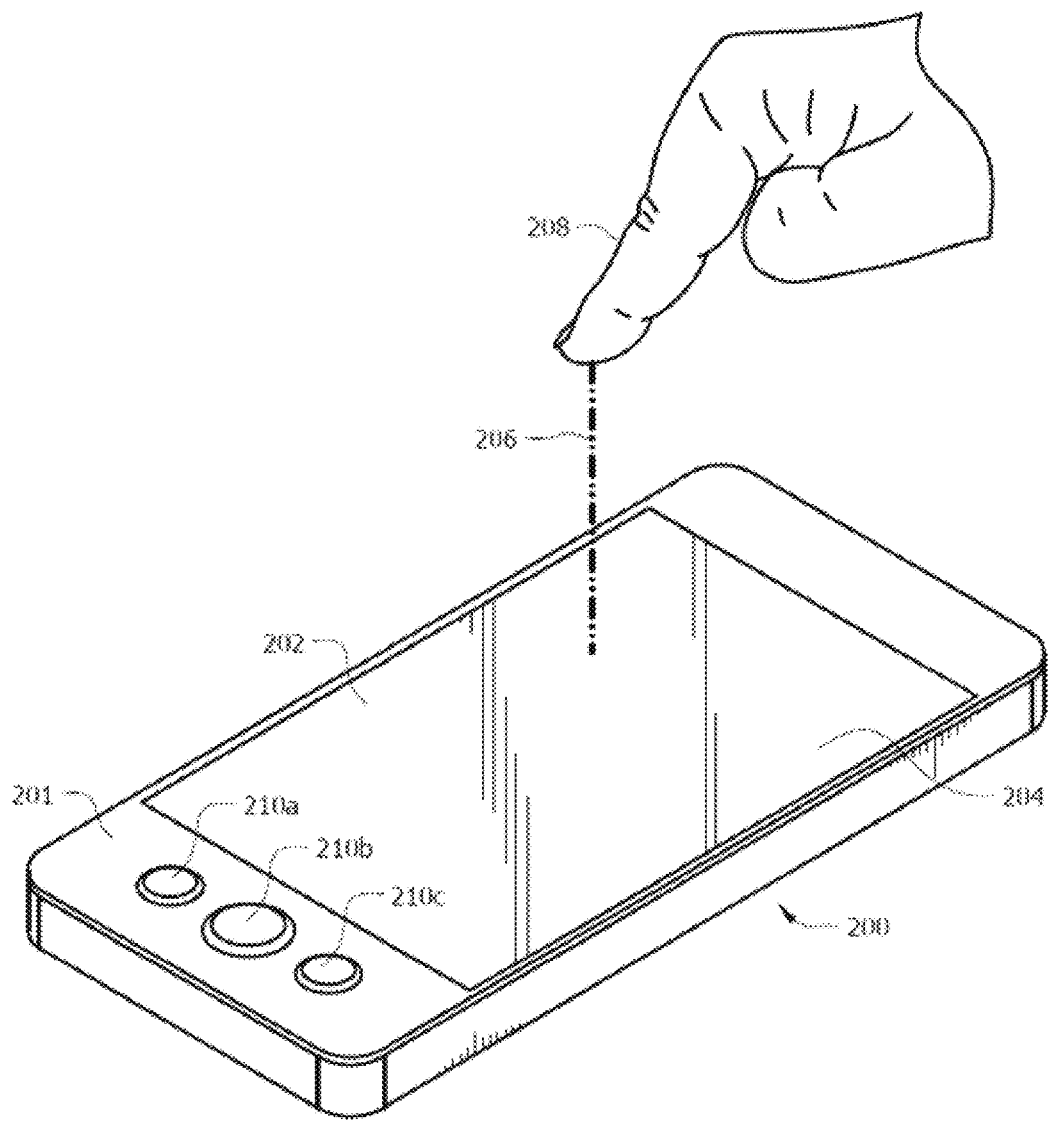
FIG. 2 illustrates an example device that houses a force sensor, according to an embodiment of the present disclosure.

FIG. 2 illustrates an example device 200 that houses force sensor 102, according to an embodiment of the present disclosure. Device 200 is any personal digital assistant, cellular telephone, smartphone, tablet computer, and the like. In one embodiment, device 200 includes other types of devices, such as automatic teller machines (ATMs), home appliances, personal computers, and any other such device having a force screen. In the illustrated example, components of system 100 are internal to device 200. Although this disclosure describes a particular device 200 having a particular implementation with particular components, this disclosure contemplates any device 200 having any implementation with any components.

A particular example of device 200 is a smartphone that includes a housing 201 and a force screen display 202 occupying a portion of a surface 204 of housing 201 of device 200. In an embodiment, housing 201 is an enclosure of device 200, which may contain internal components (e.g., internal electrical components) of device 200. Force sensor 102 may be coupled, directly or indirectly, to housing 201 of device 200. Display 202 may occupy a significant portion or all of a surface 204 (e.g., one of the largest surfaces 204) of housing 201 of device 200. Reference to a display 202 includes cover layers that overlay the actual display and force sensor elements of device 200. In the illustrated example, surface 204 is a surface of the top cover layer of display 202. In an embodiment, the top cover layer (e.g., a glass cover layer) of display 202 is considered part of housing 201 of device 200.

In one embodiment, the large size of display 202 allows the display 202 to present a wide variety of data, including a keyboard, a numeric keypad, program or application icons, and various other interfaces. In one embodiment, a user interacts with device 200 by pressing/touching display 202 with a stylus, a finger, or any other object in order to interact with device 200 (e.g., select a program for execution or to type a letter on a keyboard displayed on the display 202). In one embodiment, a user interacts with device 200 using multiple presses/touches to perform various operations, such as to zoom in or zoom out when viewing a document or image. In some embodiments, such as home appliances, display 202 does not change or changes only slightly during device operation, and recognizes only single presses/touches.

Users may interact with device 200 by physically impacting surface 204 (or another surface) of housing 201 of device 200, shown as impact 206, using an object 208, such as, for example, one or more fingers, one or more styluses, or other objects. In one embodiment, surface 204 is a cover layer that overlies display 202.

Device 200 includes buttons 210, which may perform any purpose in relation to the operation of device 200. One or more of buttons 210 (e.g., button 210b) may operate as a so-called "home button" that, at least in part, indicates to device 200 that a user is preparing to provide input to force sensor 102 of device 200. As described in greater detail below, an embodiment of the present disclosure may reduce or eliminate various reasons for including a "home button."

Figure 3:
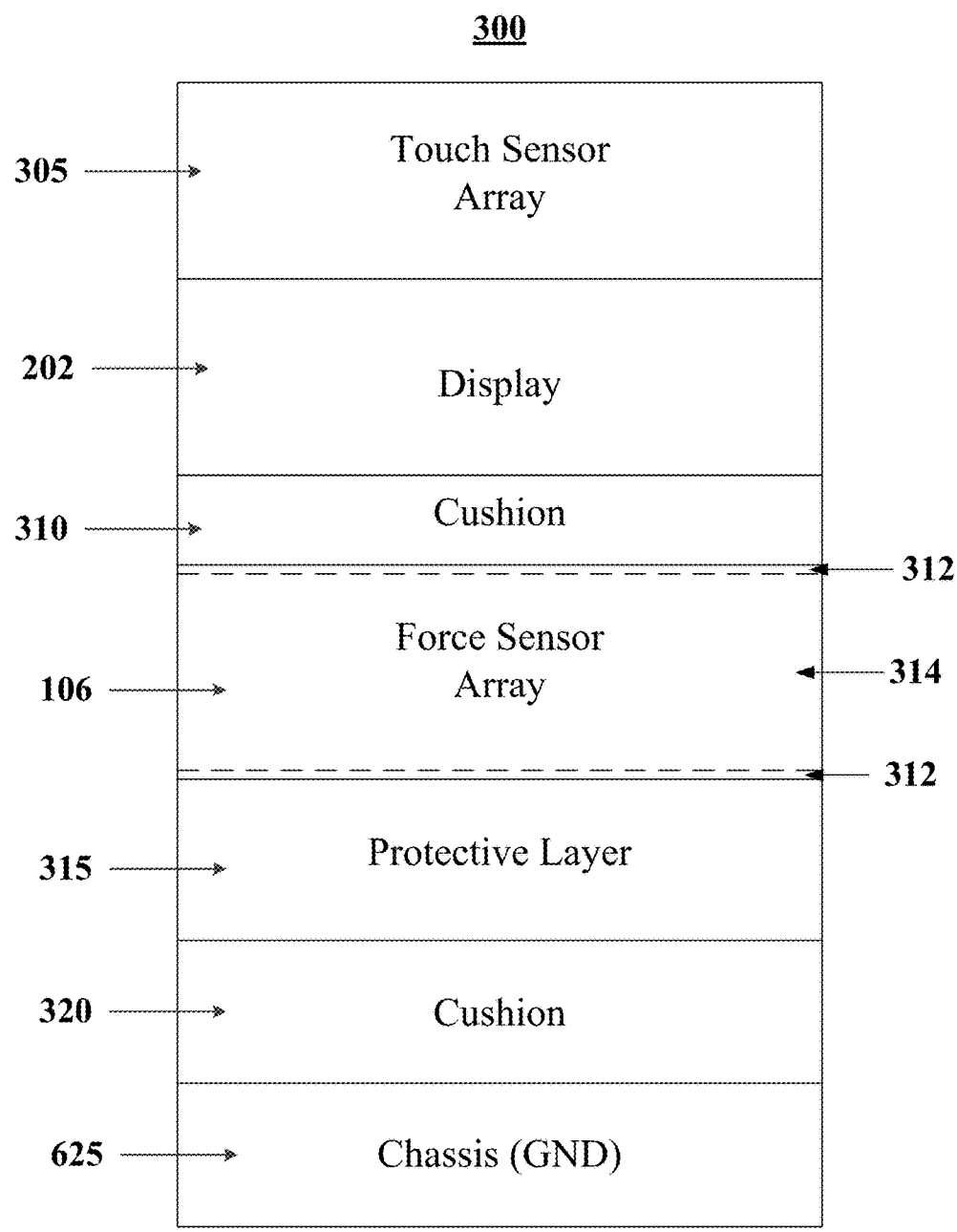
FIG. 3 illustrates an example mechanical stack of a device that includes a force sensor, according to an embodiment of the present disclosure.
Figure 4:
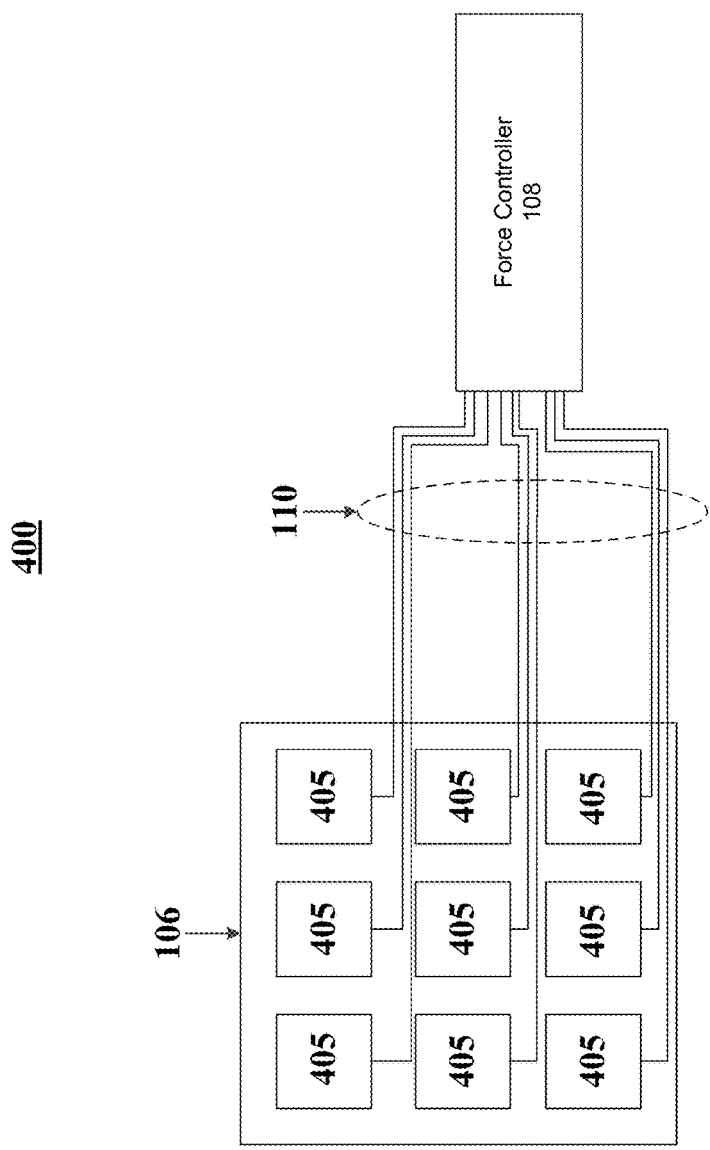
FIG. 4 illustrates an example force sensing system, according to an embodiment of the present disclosure.

FIG. 3 illustrates an example mechanical stack 300 of a device that includes a force sensor according to an embodiment of the present disclosure. As illustrated in FIG. 3, mechanical stack 300 includes a touch sensor array 305, a display 202, a cushion 310, a force sensor array 106, a protective layer 315, a cushion 320, and a chassis 625. It is understood that mechanical stack 300 is an example and that this disclosure contemplates a mechanical stack that includes more or fewer layers than those shown in FIG. 3. For example, a mechanical stack may exclude touch sensor array 305. Furthermore, this disclosure contemplates the layers of mechanical stack 300 being arranged in any particular order.

Touch sensor array 305 implements touch sensing capabilities of the device. In particular embodiments, touch sensor array 305 includes electrodes configured to capacitively couple to one another to implement touch sensing capabilities of the device. Using touch sensor array 305, the device can detect the presence and location of an object touching touch sensor array 305 and/or of an object within proximity of touch sensor array 305. The electrodes of touch sensor array 305 are coupled by tracks to a touch sensor controller of the device. In certain embodiments, the touch sensor controller and force controller 108 are implemented in the same hardware and/or physical controller. For example, the device may use one controller to implement both force controller 108 and the touch sensor controller. In some embodiments, force controller 108 and touch sensor controller are implemented in separate hardware and/or controllers.

Cushion 310 is positioned between display 202 and force sensor array 106. Cushion 310 prevents display 202 from directly contacting force sensor array 106 and/or from interfering with force sensor array 106. In some embodiments, cushion 310 is formed from a dielectric material that electrically shields force sensor array 106 from display 202. Cushion 310 may be any appropriate thickness such as, for example, 200 microns.

Force sensor array 106 implements the force sensing capabilities of the device. Force sensor array 106 includes one or more electrodes 312 disposed on a substrate 314. Electrodes 312 can be used to determine the presence, magnitude, and location of a force applied to mechanical stack 300. Particular designs for force sensor array 106 will be described in more detail using FIGS. 4 through 8B. This disclosure contemplates force sensor array 106 having any appropriate thickness such as, for example, 25 microns.

Protective layer 315 is any material that separates force sensor array 106 from cushion 320 in chassis 625. In one embodiment, protective layer 315 includes a rigid material such as a cement that protects force sensor array 106 from directly contacting cushion 320 and chassis 625. This disclosure contemplates protective layer 315 being of any appropriate thickness such as, for example, 80 microns.

Cushion 320 is any flexible material that supports protective layer 315 and force sensor array 106. This disclosure contemplates cushion 320 being any appropriate thickness such as, for example, 400 microns. When a force is applied to mechanical stack 300, cushion 320 may compress. As a result, the distance between force sensor array 106 and chassis 625 may decrease. As a result of that decrease, the capacitance between the electrodes 312 of force sensor array 106 and chassis 625 changes. Force controller 108 can detect that change in capacitance and determine that a force is being applied to mechanical stack 300.

Chassis 625 operates as a ground layer for mechanical stack 300. In one embodiment, chassis 625 also supports the other layers of mechanical stack 300. A capacitance between the electrodes 312 of force sensor array 106 and chassis 625 is monitored by force controller 108.

FIG. 4 illustrates an example force sensing system 400 according to an embodiment of the present disclosure. As illustrated in FIG. 4, force sensing system 400 includes touch sensor array 106 and force controller 108. Force sensor array 106 is coupled to force controller 108 by tracks 110. Force sensor array 106 and force controller 108 are configured to detect the presence, magnitude and location of a force applied on force sensor array 106.

Force sensor array 106 includes one or more electrodes 405. As illustrated in FIG. 4, each electrode 405 is positioned within force sensor array 106. Each electrode 405 can be used to detect a force applied within the proximity of the electrode 405. When a force is applied within proximity to an electrode 405, a capacitance associated with that electrode 405 changes. Force controller 108 can detect that change in capacitance and determine that a force is applied within proximity to that electrode 405.

As illustrated in FIG. 4, each electrode 405 is coupled to force controller 108 by a track 110. The example force sensor array 106 includes nine electrodes 405. As a result, there are nine tracks 110 coupling electrodes 405 to force controller 108. As the size of force sensor array 106 grows and/or as the number of electrodes 405 increases, the number of tracks 110 also increase. The number of tracks 110 decreases the amount of space available in a device to implement other features and/or hardware. By reducing the number of tracks 110, additional features and/or hardware can be implemented in the device.

This disclosure contemplates particular designs and patterns for electrodes 405 that reduce the number of tracks 110. In one embodiment, a design and/or pattern for electrodes 405 reduces the number of tracks 110 to four tracks. Furthermore, only four electrodes 405 are used to detect the presence, magnitude, and location of a force applied to force sensor array 106. These designs and patterns for electrodes 405 will be described in more detail using FIGS. 5A through 8B.

Figure 5A:
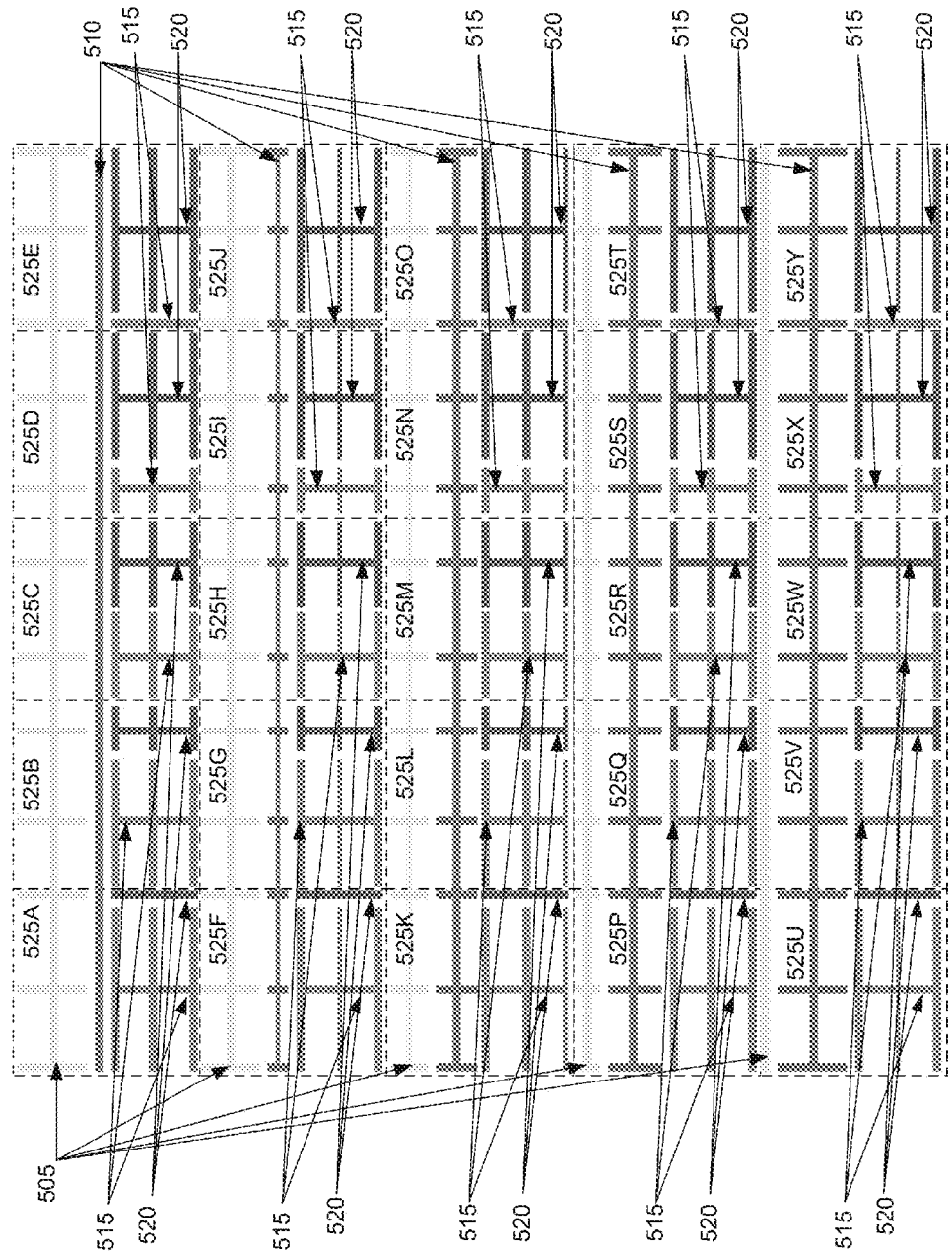
FIG. 5A illustrates an example force sensing array, according to an embodiment of the present disclosure.

FIG. 5A illustrates an example force sensing array 106 according to an embodiment of the present disclosure. As illustrated in FIG. 5A, force sensing array 106 includes four electrodes: 505, 510, 515 and 520. The electrodes 505, 510, 515 and 520 are configured in a particular pattern across force sensing array 106. In one embodiment, by using this pattern of electrodes 505, 510, 515 and 520, force sensing array 106 can detect the presence, magnitude, and location of a force applied to force sensing array 106 using only four electrodes.

The electrodes 505, 510, 515 and 520 are configured such that force sensing array 106 can be divided into a grid of cells 525A through 525Y. Each cell includes a portion of electrodes 505, 510, 515 and 520. The densities of electrodes 505, 510, 515 and/or 520 changes from cell to cell. For example, in cell 525A, electrodes 510 and 520 occupy smaller areas than electrodes 505 and 515. In cell 525M, electrodes 515 and 520 occupy substantially the same area and electrodes 505 and 510 occupy substantially the same area.

In one embodiment, by varying the densities of the electrodes 505, 510, 515 and 520 across the cells 525A through 525Y, it becomes possible to detect a location of a force applied to force sensing array 106 by analyzing a ratio of the signals communicated by electrodes 505, 510, 515 and 520. In the illustrated example of FIG. 5A, the area of a cell occupied by electrode 505 increases from the bottom of array 106 to the top of array 106 while the area of a cell occupied by electrode 510 increases from the top of array 106 to the bottom of array 106. Similarly, the area of a cell occupied by electrode 515 increases from the left of array 106 to the right of array 106 while the area of a cell occupied by electrode 520 increases from the right of array 106 to the left of array 106. If a force is applied to cell 525A, then the signal communicated by electrode 505 is expected to be larger than the signal communicated by electrode 510 because electrode 505 occupies a larger area in cell 525A than electrode 510. Likewise, the signal communicated by electrode 515 is expected to be larger than the signal communicated by electrode 520. In contrast, if the force is instead applied to cell 525M, then the signal communicated by electrode 505 is expected to be substantially the same as the signal communicated by electrode 510 because electrode 505 occupies substantially the same area in cell 525M as electrode 510. Likewise, the signal communicated by electrode 515 is expected to be substantially the same as the signal communicated by electrode 520. By determining the ratio between the signals communicated by electrode 505 and electrode 510 and the ratio between the signals communicated by electrode 515 and electrode 520, force controller 108 can determine which cell is the cell on which a force is applied. In one embodiment, each cell of force sensing array 106 includes only four electrodes: 505, 510, 515 and 520. Furthermore, the cells 525A through 525Y are of substantially equal size (e.g., within 1% difference in area).

In one embodiment, each of the electrodes 505, 510, 515 and 520 include a plurality of fingers extending from a body. By varying the length of the fingers extending from the body, the density of the electrodes in a cell can be varied. For example, in the first row of cells 525A through 525E, the fingers of electrode 515 become shorter from cell 525A to cell 525E. In contrast, the fingers of electrode 520 increase in length from cell 525A to cell 525E.

In one embodiment, electrodes 505, 510, 515 and 520 determine different types of position of an applied force. For example, force controller 108 uses electrodes 505 and 510 to determine a vertical position of an applied force, and force controller 108 uses electrodes 515 and 520 to determine a horizontal position of the applied force. If a ratio between the signals communicated by electrodes 515 and 520 are substantially the same, then force controller 108 determines that the force is applied on the column of cells 525C, 525H, 525M, 525R and 525W. If a ratio between the signals communicated by electrode 505 and electrode 510 is large, then force controller 108 determines that the force is applied on the row of cells 525A through 525E. As a result of these two determinations, force controller 108 determines that the force is applied on cell 525C.

In one embodiment, the electrodes 505, 510, 515, and 520 are balanced across force sensing array 106. For example, electrodes 505 and 510 may be configured to occupy substantially the same amount of area as electrodes 515 and 520 across force sensing array 106. As another example, electrodes 505 and 510 may occupy the same amount of area that electrodes 515 and 520 occupy across a row of cells. This disclosure contemplates balancing the electrodes 505, 510, 515, and 520 in any appropriate manner. For example, the electrodes 505, 510, 515, and 520 can be balanced by adjusting the thicknesses of the electrodes 505, 510, 515, and 520. As another example, the electrodes 505, 510, 515, and 520 can be balanced by adjusting the number of fingers of each electrode 505, 510, 515, and 520. The fingers will be discussed in more detail using subsequent figures.

Figure 5B:
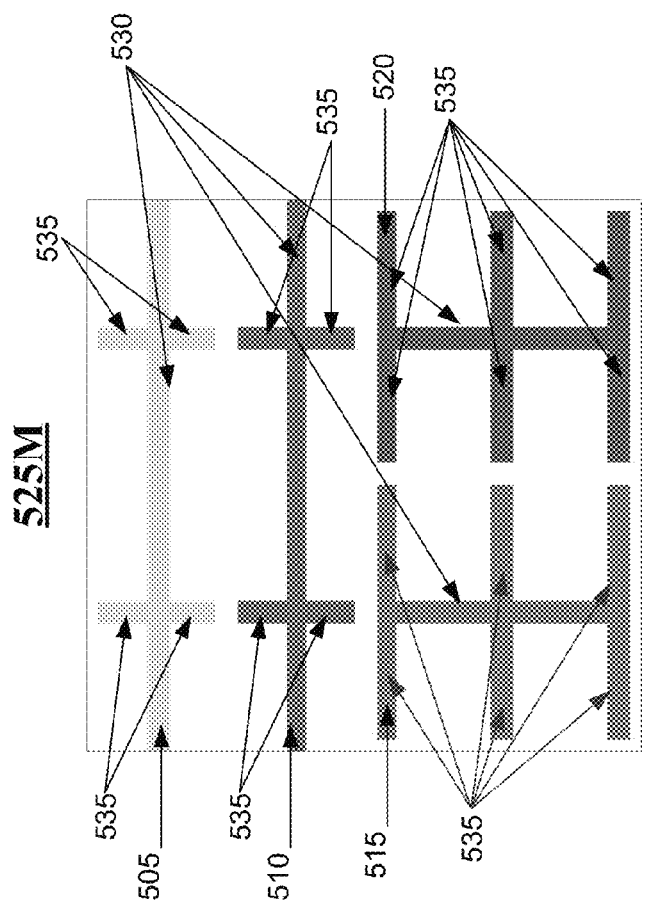
FIG. 5B illustrates a cell of an example force sensing array, according to an embodiment of the present disclosure.

FIG. 5B illustrates a cell 525M of an example force sensing array 106 according to an embodiment of the present disclosure. As illustrated in FIG. 5B, cell 525M includes four electrodes 505, 510, 515, and 520. Each electrode 505, 510, 515, and 520 includes a plurality of fingers extending from a body of the electrode. For example, electrode 505 includes a body 530 and one or more fingers 535 extending from body 530. Likewise, electrode 510 includes a body 530 and one or more fingers 535 extending from the body. Electrodes 515 and 520 also include a body 530 and one or more fingers 535 extending from the body. In certain embodiments, by varying the length of fingers 535 the density of electrodes 505, 510, 515, and 520 is varied.

Electrodes 505, 510, 515 and 520 may be configured to detect an applied force using only four tracks. In one embodiment, electrodes 505, 510, 515, and 520 are disposed on opposing surfaces of a substrate. For example, electrodes 505 and 510 are disposed on a top surface of the substrate and electrodes 505 and 510 are disposed on a bottom surface of the substrate.

Figure 6A:
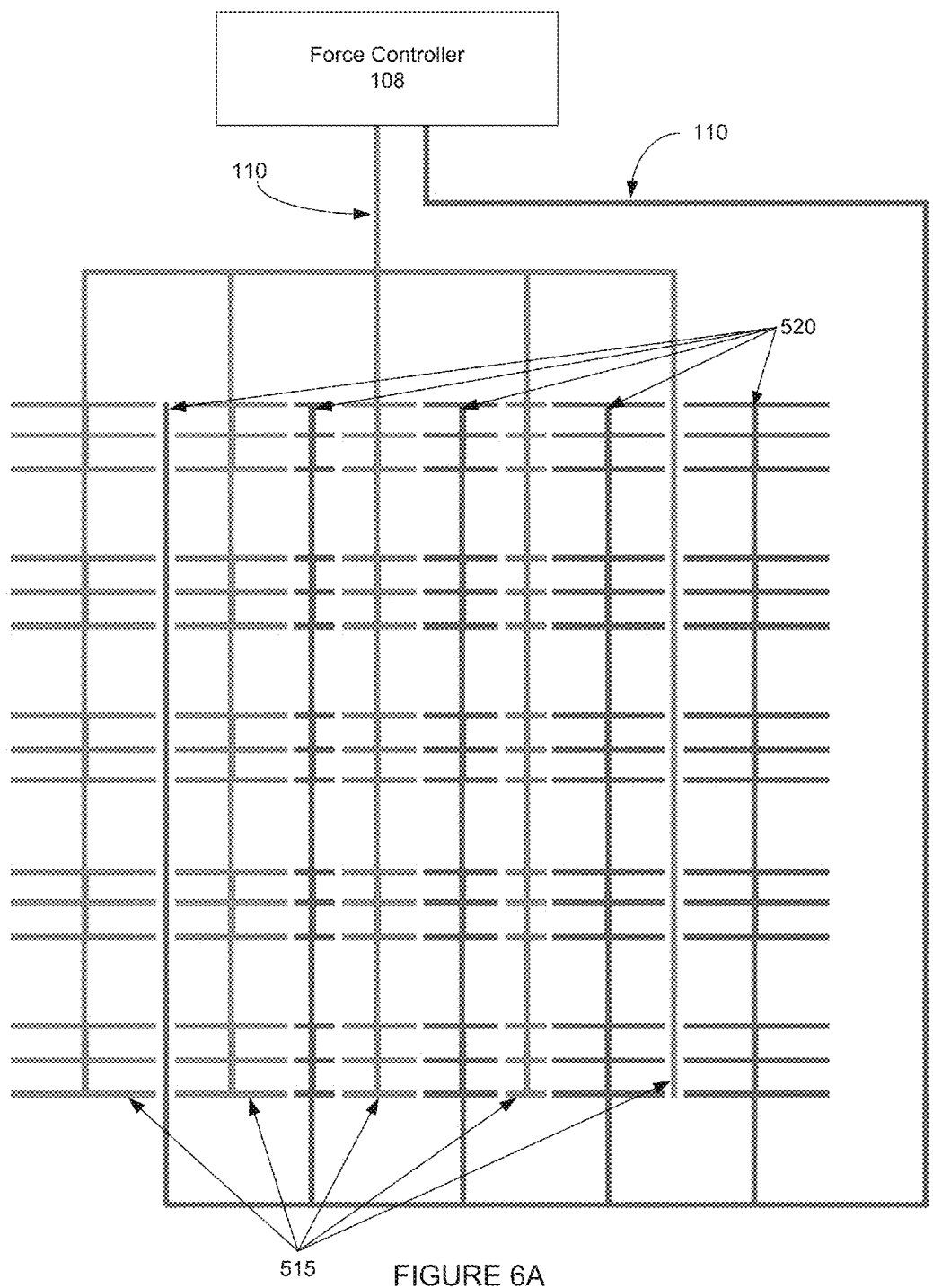
FIG. 6A illustrates an example force sensing system, according to an embodiment of the present disclosure.
Figure 6B:
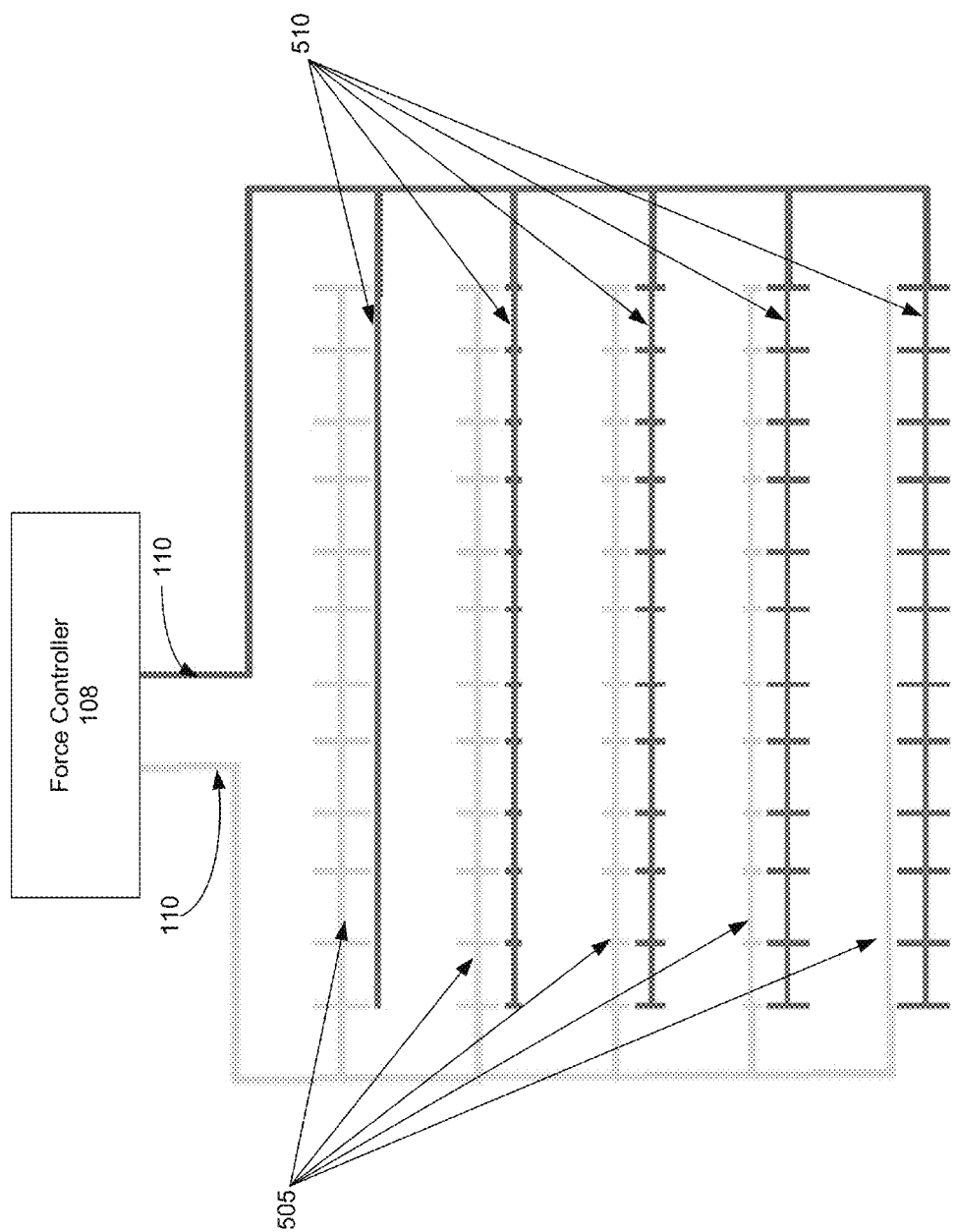
FIG. 6B illustrates an example force sensing system, according to an embodiment of the present disclosure.

FIGS. 6A and 6B illustrate an example force sensing system according to an embodiment of the present disclosure. FIG. 6A illustrates a first surface of a substrate and FIG. 6B illustrates a second surface of the substrate. Electrodes 515 and 520 are disposed on the first surface of the substrate and electrodes 505 and 510 are disposed on the second surface of the substrate. These two surfaces of the substrate may be opposite each other. For example, electrodes 505 and 510 may be disposed on a top surface of the substrate 314 and electrodes 515 and 520 may be disposed on a bottom surface of the substrate 314.

By disposing electrodes 505 and 510 and electrodes 515 and 520 on different surfaces of the substrate, space is provided to run tracks 110 to each of electrodes 505, 510, 515, and 520. The tracks for one electrode do not intersect with another electrode or another set of tracks 110. Furthermore, portions of electrodes 515 and 520 may also be coupled by extensions to other portions of those electrodes 515 and 520. In the illustrated example of FIG. 6A, portions of electrode 515 are coupled such that electrode 515 extends through each of the cells of force sensing array 106. Furthermore, electrode 520 is similarly extended through the cells of force sensing array 106 so that the portions of electrode 520 are coupled together.

In this manner, only four electrodes 505, 510, 515, and 520 are needed to detect the presence, magnitude and location of a force applied to force sensing array 106. Each electrode is coupled to a track 110 that carries signals from the electrodes to force controller 108. Force controller 108 analyzes signals communicated by the electrodes through tracks 110 to determine the presence, magnitude, and location of a force applied to force sensing array 106 (as described above). As a result, additional space is available in a device to implement other features and/or hardware.

In one embodiment, electrodes 505, 510, 515, and 520 are implemented on the same surface of substrate 314. Vias and/or dielectric material is placed at the intersections of electrodes 505, 510, 515, and 520 and intersections between tracks 110 to prevent electrical contact.

FIGS. 7A, 7B, 8A, and 8B show other contemplated designs and patterns for electrodes 505, 515, 510, and 520 across force sensing array 106. For each design, this disclosure contemplates the electrodes being disposed on opposing surfaces of a substrate and/or the same surface of the substrate.

Figure 7A:
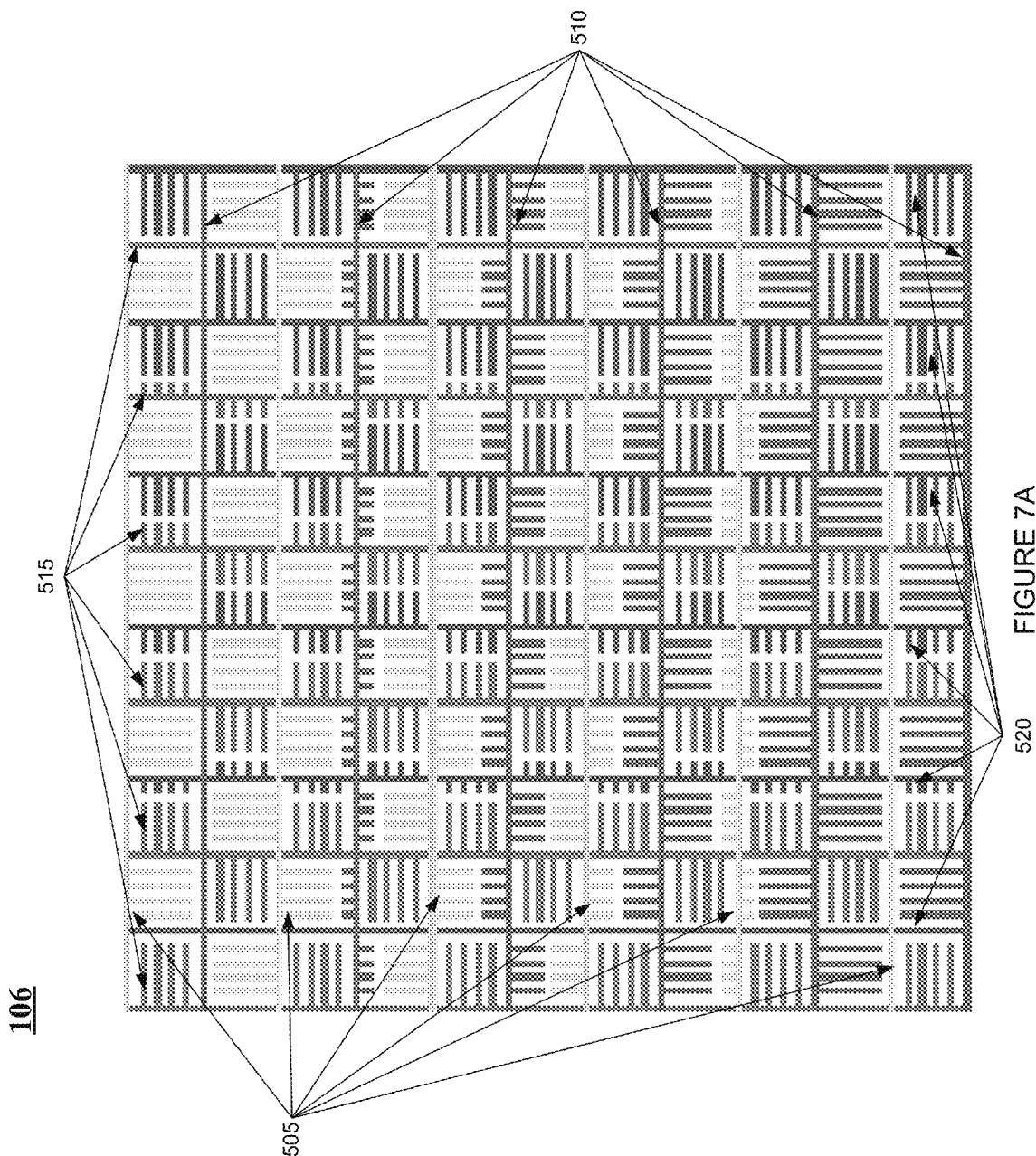
FIG. 7A illustrates an example force sensing array, according to an embodiment of the present disclosure.

FIG. 7A illustrates an example force sensing array 106 according to an embodiment of the present disclosure. As shown in FIG. 7A, electrodes 505, 510, 515, and 520 are arranged in a square or grid-like pattern. In this pattern, each electrode pair, for example electrodes 505 and 510 and electrodes 515 and 520, occupy substantially the same area within each cell. As with previously described designs, each electrode includes a plurality of fingers extending from a body. The length of these fingers vary across force sensing array 106. As a result, a ratio of the signals communicated by the electrodes will change depending on which portion of force sensing array 106 is closest to an applied force.

Figure 7B:
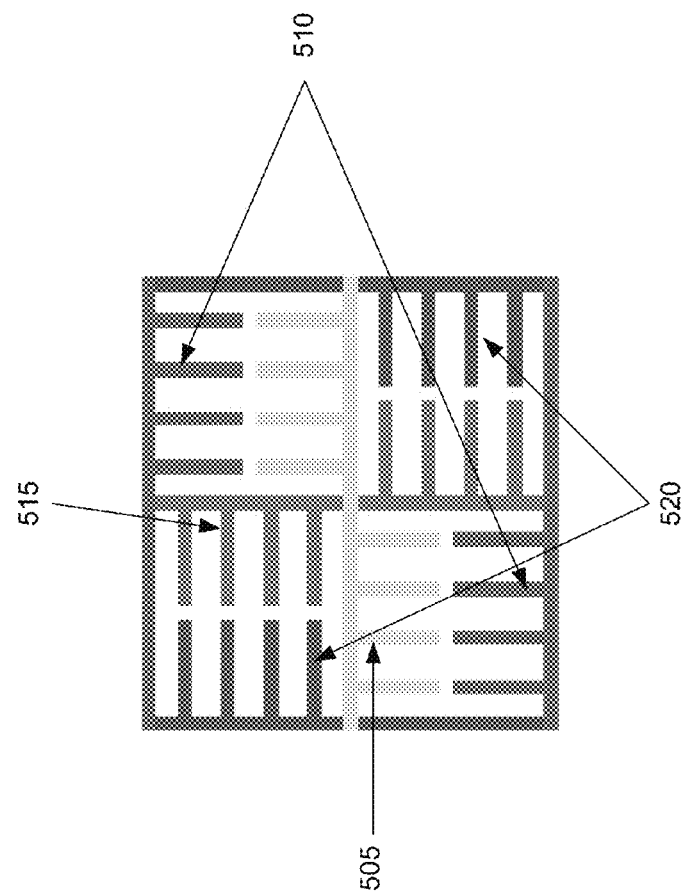
FIG. 7B illustrates a cell of an example force sensing array, according to an embodiment of the present disclosure.

FIG. 7B illustrates a cell 700 of an example force sensing array 106 according to an embodiment of the present disclosure. As illustrated in FIG. 7B, cell 700 includes electrodes 505, 510, 515, and 520. Each of these electrodes extends through cell 700. Furthermore, in the illustrated example of FIG. 7B, the fingers of each electrode pair, for example electrodes 505 and 510 and electrodes 515 and 520, are substantially the same length. However, for different cells of force sensing array 106, these fingers may have different lengths.

Figure 8A:
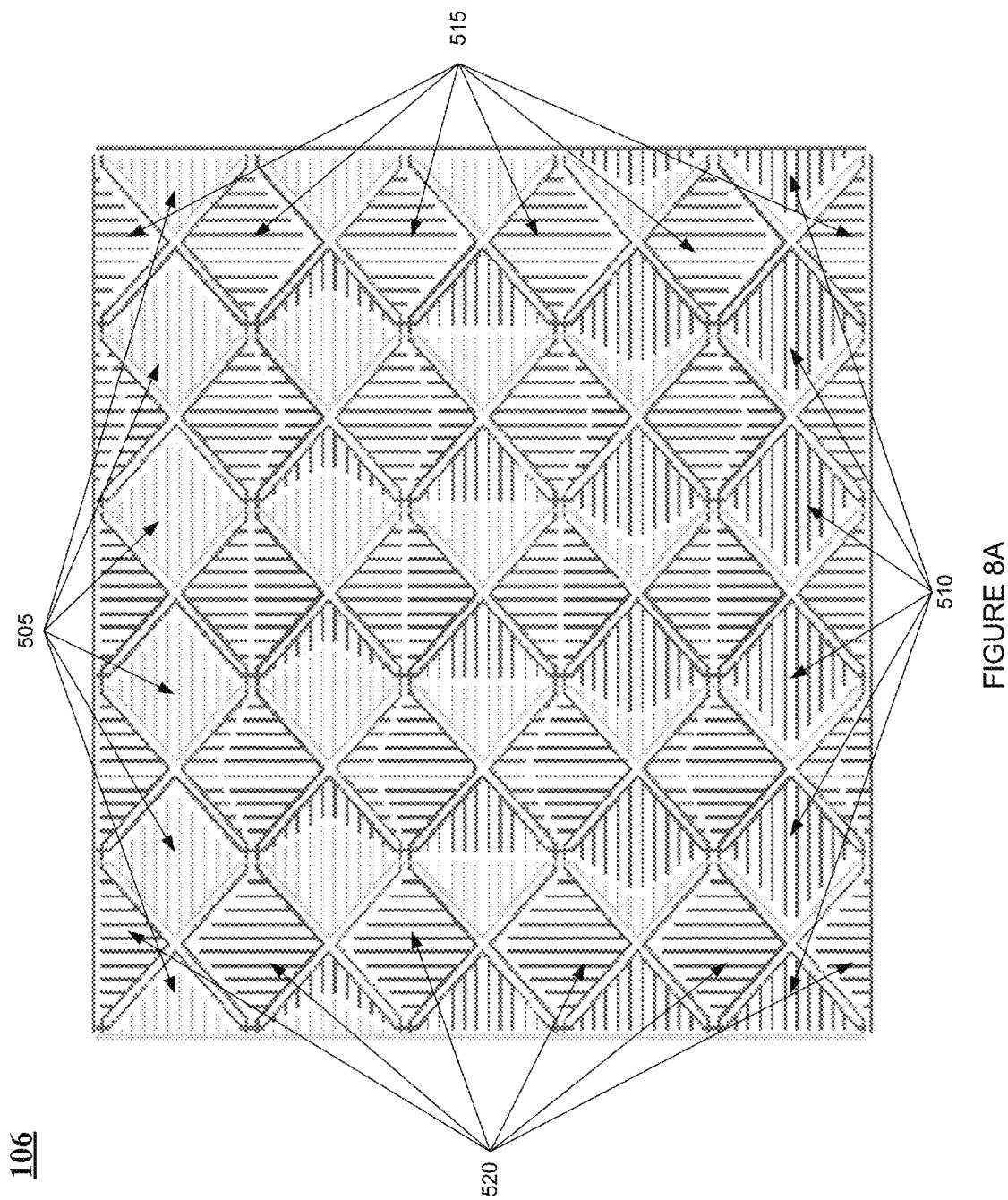
FIG. 8A illustrates an example force sensing array, according to an embodiment of the present disclosure.

FIG. 8A illustrates an example force sensing array 106 according to an embodiment of the present disclosure. As illustrated in FIG. 8A, force sensing array 106 includes electrodes 505, 510, 515, and 520 arranged in a diamond pattern. Each of the electrodes includes a plurality of fingers extending from a body. The lengths of these fingers may vary across force sensing array 106. As a result, a ratio of the signals communicated by the electrodes will vary depending on the location of an applied force on force sensing array 106.

Figure 8B:
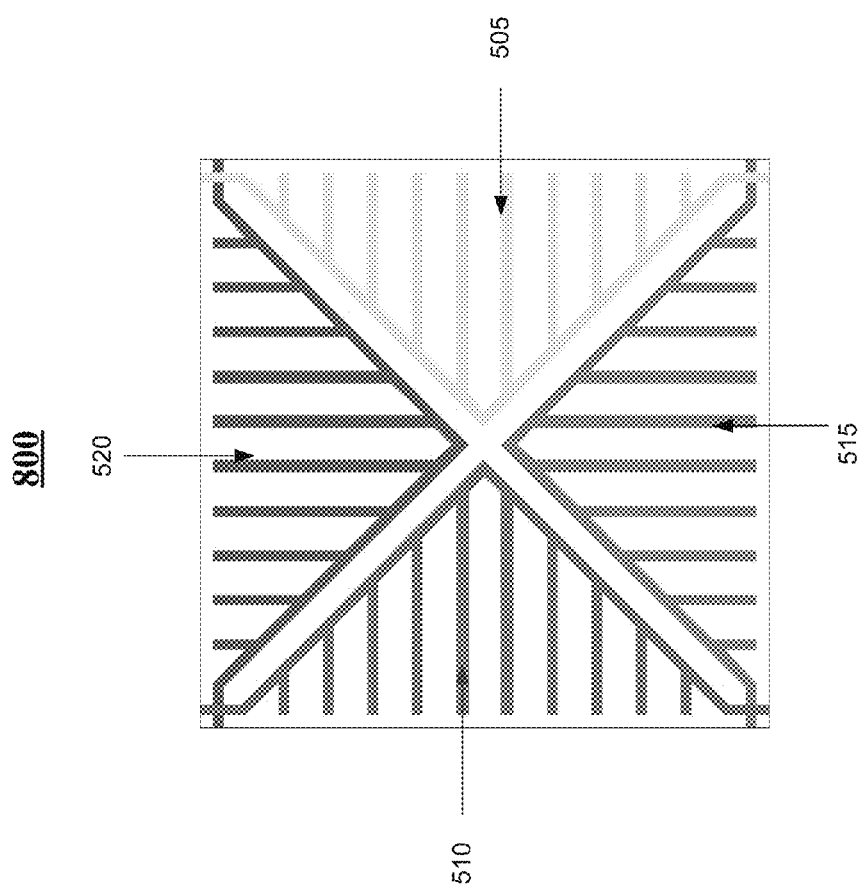
FIG. 8B illustrates a cell of an example force sensing array, according to an embodiment of the present disclosure.

FIG. 8B illustrates a cell 800 of an example force sensing array 106 according to an embodiment of the present disclosure. As illustrated in FIG. 8B, cell 800 includes electrodes 505, 510, 515, and 520. Each of these electrodes extends through cell 800. Furthermore, in the illustrated example of FIG. 8B, each of the fingers of electrodes 505, 510, 515, and 520 are substantially the same length. However, different cells of force sensing array 106 may have different lengths for these fingers and/or a different number of fingers.

In one embodiment, an apparatus includes a force sensor circuit and a controller. The substrate includes first, second, third, and fourth electrodes. The first electrode is disposed on the substrate and extends through first and second cells of a row of cells. The first and second cells are of substantially equal size and the first electrode occupies more area in the first cell than the first electrode occupies in the second cell. The second electrode is disposed on the substrate and extends through the first and second cells. The second electrode occupies more area in the second cell than the second electrode occupies in the first cell. The third electrode is disposed on the substrate and extends through third and fourth cells of a column of cells. The third and fourth cells are of substantially equal size and the third electrode occupies more area in the third cell than the third electrode occupies in the fourth cell. The fourth electrode is disposed on the substrate and extends through the third and fourth cells. The fourth electrode occupies more area in the fourth cell than the fourth electrode occupies in the third cell. The controller detects a force and a position of the force based on signals communicated by the force sensor circuit. In one embodiment, the apparatus further includes a first track coupled to the first electrode, a second track coupled to the second electrode, a third track coupled to the third electrode, and a fourth track coupled to the fourth electrode. In one embodiment, the controller detects the position of the force based on a first ratio of a first signal of the first electrode and a second signal of the second electrode and a second ratio of a third signal of the third electrode and a fourth signal of the fourth electrode. In one embodiment, each of the first, second, third, and fourth electrodes comprise a plurality of fingers extending from a body. In one embodiment, a first finger of the plurality of fingers of the first electrode is a different length than a second finger of the plurality of fingers of the first electrode and the first finger is in the first cell and the second finger is in the second cell. In one embodiment, the controller determines a horizontal position of the force based on signals of the first and second electrodes of the first cell and a vertical position of the force based on signals of the third and fourth electrodes of the third cell. In one embodiment, the first and second electrodes of the first cell are disposed on a first surface of the substrate and the third and fourth electrodes of the first cell are disposed on a second surface of the substrate. In one embodiment, the first cell contains only four electrodes. In one embodiment, the first and second electrodes occupy substantially the same amount of area as the third and fourth electrodes. In one embodiment, an amount of area occupied by the first and second electrodes in the row of cells is substantially the same amount of area occupied by the third and fourth electrodes in the column of cells In one embodiment, a force sensor includes a substrate, a first electrode, a second electrode, a third electrode, and a fourth electrode. The first electrode is disposed on the substrate and extends through first and second cells of a row of cells. The first and second cells being of substantially equal size, and the first electrode occupies more area in the first cell than the first electrode occupies in the second cell. The second electrode is disposed on the substrate and extends through the first and second cells. The second electrode occupies more area in the second cell than the second electrode occupies in the first cell. The third electrode is disposed on the substrate and extends through third and fourth cells of a column of cells. The third and fourth cells being of substantially equal size, and the third electrode occupies more area in the third cell than the third electrode occupies in the fourth cell. The fourth electrode is disposed on the substrate and extends through the third and fourth cells. The fourth electrode occupies more area in the fourth cell than the fourth electrode occupies in the third cell. In one embodiment, the first and second electrodes extend through the third and fourth cells and the third and fourth electrodes extend through the first and second cells. In one embodiment, the force sensor includes a first track coupled to the first electrode, a second track coupled to the second electrode, a third track coupled to the third electrode, and a fourth track coupled to the fourth electrode. In one embodiment, each of the first, second, third, and fourth electrodes include a plurality of fingers extending from a body. In one embodiment, a first finger of the plurality of fingers of the first electrode is a different length than a second finger of the plurality of fingers of the first electrode and the first finger is in the first cell and the second finger is in the second cell. In one embodiment, the first and second electrodes are disposed on a first surface of the substrate and the third and fourth electrodes of the first cell are disposed on a second surface of the substrate. In one embodiment, the first cell contains only four electrodes. In one embodiment, the first and second electrodes occupy substantially the same amount of area on the substrate as the third and fourth electrodes. In one embodiment, an amount of area occupied by the first and second electrodes in the row of cells is substantially the same amount of area occupied by the third and fourth electrodes in the column of cells.

In one embodiment, an apparatus includes a force sensor circuit, a controller, and first, second, third, and fourth tracks. The force sensor circuit includes a substrate and first, second, third, and fourth electrodes. The first electrode is disposed on the substrate and extends through first and second cells of a row of cells. The first and second cells being of substantially equal size, and the first electrode occupies more area in the first cell than the first electrode occupies in the second cell. The second electrode is disposed on the substrate and extends through the first and second cells. The second electrode occupies more area in the second cell than the second electrode occupies in the first cell. The third electrode is disposed on the substrate and extends through third and fourth cells of a column of cells. The third and fourth cells being of substantially equal size, and the third electrode occupies more area in the third cell than the third electrode occupies in the fourth cell. The fourth electrode is disposed on the substrate and extends through the third and fourth cells. The fourth electrode occupies more area in the fourth cell than the fourth electrode occupies in the third cell. The controller detects a force and a position of the force based on signals communicated by the force sensor circuit. The first track couples the first electrode to the controller. The second track couples the second electrode to the controller. The third track couples the third electrode to the controller. The fourth track couples the fourth electrode to the controller. The first cell contains only four electrodes. Each of the first, second, third, and fourth electrodes include a plurality of fingers extending from a body.

Embodiments of the present disclosure provide one or more technical advantages. For example, one embodiment reduces the number of tracks used to implement force sensing. As another example, one embodiment detects a position of a force using a force sensor that has only four electrodes. Certain embodiments of the invention may include none, some, or all of the above technical advantages. One or more other technical advantages may be readily apparent to one skilled in the art from the figures, descriptions, and claims included herein.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, components referred to as being "coupled" includes the components being directly coupled or indirectly coupled.

This disclosure encompasses a myriad of changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   a force sensor circuit comprising:
      a substrate;
      a first electrode disposed on the substrate, the first electrode extending through first and second cells of a row of cells, and the first electrode occupying more area in the first cell than the first electrode occupies in the second cell;
      a second electrode disposed on the substrate, the second electrode extending through the first and second cells, the second electrode occupying more area in the second cell than the second electrode occupies in the first cell;
      a third electrode disposed on the substrate, the third electrode extending through third and fourth cells of a column of cells, and the third electrode occupying more area in the third cell than the third electrode occupies in the fourth cell; and
      a fourth electrode disposed on the substrate, the fourth electrode extending through the third and fourth cells, the fourth electrode occupying more area in the fourth cell than the fourth electrode occupies in the third cell; and
   a controller configured to detect a force and a position of the force based on signals communicated by the force sensor circuit.

2. The apparatus of claim 1, further comprising:
   a first track coupled to the first electrode;
   a second track coupled to the second electrode;
   a third track coupled to the third electrode; and
   a fourth track coupled to the fourth electrode.

3. The apparatus of claim 1, wherein the controller is configured to detect the position of the force based on:
   a first ratio of a first signal of the first electrode and a second signal of the second electrode; and
   a second ratio of a third signal of the third electrode and a fourth signal of the fourth electrode.

4. The apparatus of claim 1, wherein each of the first, second, third, and fourth electrodes comprise a plurality of fingers extending from a body.

5. The apparatus of claim 4, wherein a first finger of the plurality of fingers of the first electrode is a different length than a second finger of the plurality of fingers of the first electrode, the first finger in the first cell and the second finger in the second cell.

6. The apparatus of claim 1, where in the controller is further configured to:
   determine a horizontal position of the force based on signals of the first and second electrodes of the first cell; and
   determine a vertical position of the force based on signals of the third and fourth electrodes of the third cell.

7. The apparatus of claim 1, wherein:
   the first and second electrodes of the first cell are disposed on a first surface of the substrate; and
   the third and fourth electrodes of the first cell are disposed on a second surface of the substrate.

8. The apparatus of claim 1, wherein the first cell contains only four electrodes.

9. The apparatus of claim 1, wherein the first and second electrodes occupy substantially the same amount of area as the third and fourth electrodes.

10. The apparatus of claim 1, wherein an amount of area occupied by the first and second electrodes in the row of cells is substantially the same amount of area occupied by the third and fourth electrodes in the column of cells.

11. A force sensor comprising:
    a substrate;
    a first electrode disposed on the substrate, the first electrode extending through first and second cells of a row of cells, and the first electrode occupying more area in the first cell than the first electrode occupies in the second cell;
    a second electrode disposed on the substrate, the second electrode extending through the first and second cells, the second electrode occupying more area in the second cell than the second electrode occupies in the first cell;
    a third electrode disposed on the substrate, the third electrode extending through third and fourth cells of a column of cells, and the third electrode occupying more area in the third cell than the third electrode occupies in the fourth cell; and
    a fourth electrode disposed on the substrate, the fourth electrode extending through the third and fourth cells, the fourth electrode occupying more area in the fourth cell than the fourth electrode occupies in the third cell.

12. The force sensor of claim 11, wherein:
    the first and second electrodes extend through the third and fourth cells; and
    the third and fourth electrodes extend through the first and second cells.

13. The force sensor of claim 11, further comprising:
    a first track coupled to the first electrode;
    a second track coupled to the second electrode;
    a third track coupled to the third electrode; and
    a fourth track coupled to the fourth electrode.

14. The force sensor of claim 11, wherein each of the first, second, third, and fourth electrodes comprise a plurality of fingers extending from a body.

15. The force sensor of claim 14, wherein a first finger of the plurality of fingers of the first electrode is a different length than a second finger of the plurality of fingers of the first electrode, the first finger in the first cell and the second finger in the second cell.

16. The force sensor of claim 11, wherein:
    the first and second electrodes are disposed on a first surface of the substrate; and
    the third and fourth electrodes of the first cell are disposed on a second surface of the substrate.

17. The force sensor of claim 11, wherein the first cell contains only four electrodes.

18. The force sensor of claim 11, wherein the first and second electrodes occupy substantially the same amount of area on the substrate as the third and fourth electrodes.

19. The force sensor of claim 11, wherein an amount of area occupied by the first and second electrodes in the row of cells is substantially the same amount of area occupied by the third and fourth electrodes in the column of cells.

20. An apparatus comprising:
   a force sensor circuit comprising:
      a substrate;
      a first electrode disposed on the substrate, the first electrode extending through first and second cells of a row of cells, and the first electrode occupying more area in the first cell than the first electrode occupies in the second cell;
      a second electrode disposed on the substrate, the second electrode extending through the first and second cells, the second electrode occupying more area in the second cell than the second electrode occupies in the first cell;
      a third electrode disposed on the substrate, the third electrode extending through third and fourth cells of a column of cells, and the third electrode occupying more area in the third cell than the third electrode occupies in the fourth cell; and
      a fourth electrode disposed on the substrate, the fourth electrode extending through the third and fourth cells, the fourth electrode occupying more area in the fourth cell than the fourth electrode occupies in the third cell;
   a controller configured to detect a force and a position of the force based on signals communicated by the force sensor circuit;
   a first track coupling the first electrode to the controller;
   a second track coupling the second electrode to the controller;
   a third track coupling the third electrode to the controller; and
   a fourth track coupling the fourth electrode to the controller, wherein:
      the first cell contains only four electrodes; and
      each of the first, second, third, and fourth electrodes comprise a plurality of fingers extending from a body.

* * * * *

UNITED STATES PATENT AND TRADEMARK OFFICE
CERTIFICATE OF CORRECTION

| | |
|---|---|
| PATENT NO. | : 10,372,255 B2 |
| APPLICATION NO. | : 15/918310 |
| DATED | : August 6, 2019 |
| INVENTOR(S) | : Hinson |

It is certified that error appears in the above-identified patent and that said Letters Patent is hereby corrected as shown below:

On the Title Page

Item (73), Assignee name should read "Neodrón Limited".

Signed and Sealed this
Eleventh Day of August, 2020

Andrei Iancu
*Director of the United States Patent and Trademark Office*